United States Patent Office 3,469,793
Patented Sept. 30, 1969

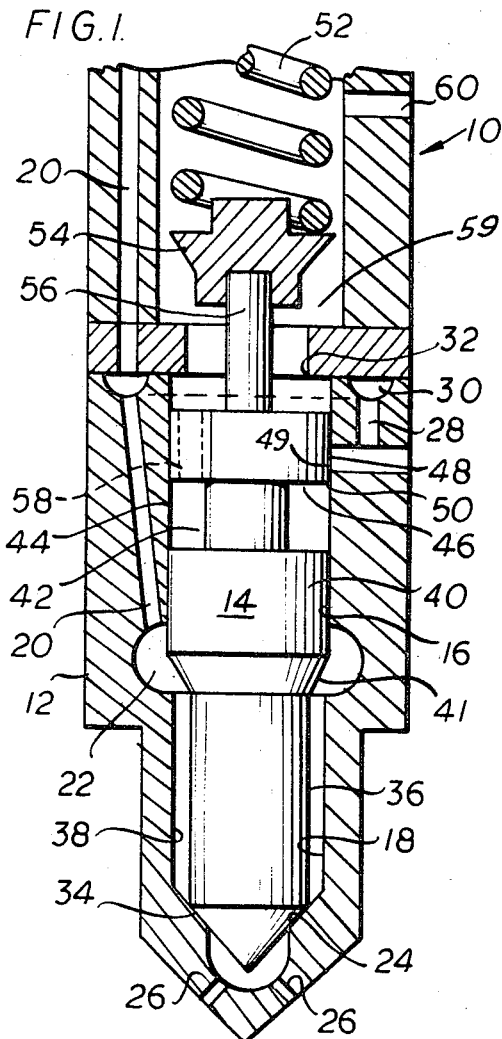
FIG. 1.
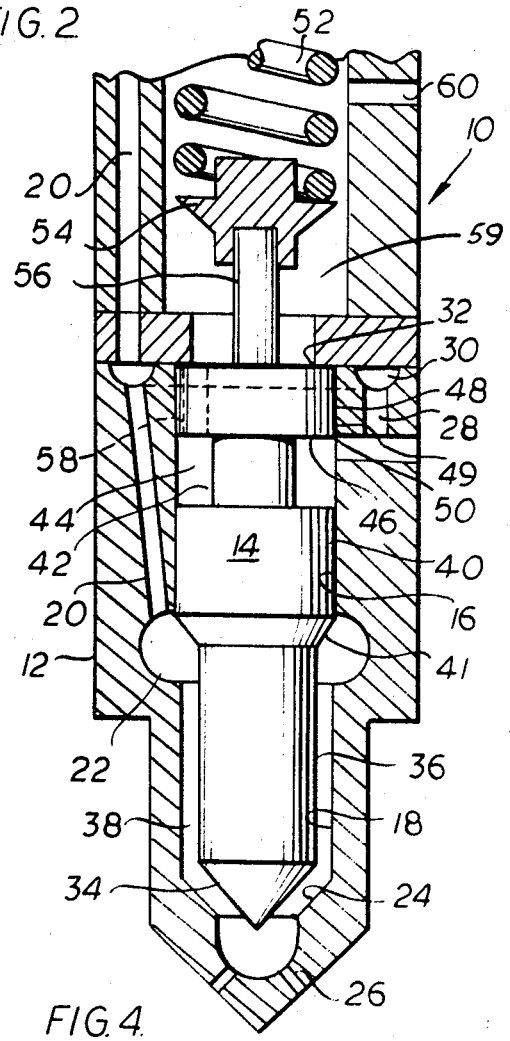
FIG. 2.
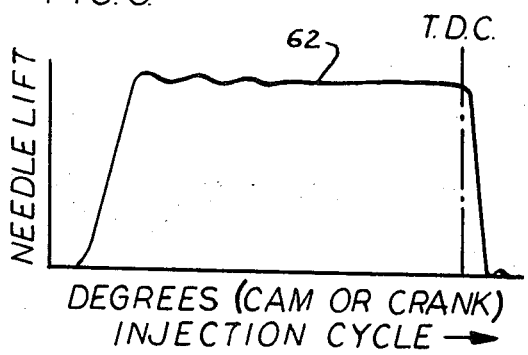
FIG. 3.
FIG. 4.
INVENTOR
RUDOLF W. GUERTLER
ATTY

3,469,793
FUEL INJECTION SYSTEM
Rudolf W. Guertler, Fort Wayne, Ind., assignor to International Harvester Company, Chicago, Ill., a corporation of Delaware
Filed May 11, 1967, Ser. No. 637,800
Int. Cl. B05b *1/32;* F23d *11/00*
U.S. Cl. 239—533                                            4 Claims

ABSTRACT OF THE DISCLOSURE

A fuel injection system for an internal combustion engine wherein the rate at which fuel is introduced into the combustion chamber during the fuel injection period is controlled in accordance with the rate at which the air is also introduced into the combustion chamber so as to insure the continuous formation of a substantially homogeneous fuel/air mixture throughout the injection period at a formation rate consistent with maximum utilization of the air and fuel and complete and efficient burning of the fuel/air mixtures and to thereby enhance the overall efficiency of the combustion process. The fuel injection system includes a fuel injection nozzle capable of introducing the liquid fuel charge into the combustion chamber in the form of a multiplicity of small injections during the normal fuel injection rather than by a single large injection.

Background and summary of the invention

This invention relates to a fuel injection system, and more particularly to a fuel injection system including a fuel injection nozzle for introducing the charge of liquid fuel into a combustion chamber in the form of a multiplicity of small injections during the fuel injection cycle to improve combustion characteristics.

In internal combustion engines of the type to which the present invention is applicable, fuel injectors are employed for introducing liquid fuel into the combustion space or chamber where it is mixed with air to form a heterogeneous mixture capable of being ignited and burned in the combustion chamber. In one variety of engines, the liquid fuel emerges from the fuel injector in the form of a substantially solid stream while in certain other engines the liquid fuel is discharged from the fuel injector through one or more relatively small orifices which cause the fuel stream to be split in a multitude of minute droplets to form what is commonly referred to as a substantially atomized fuel spray. Regardless of the variety of engines involved, one of the primary objectives of engine designers is to provide means and incorporate a combustion process in the engine for deriving the maximum power from the fuel introduced into the combustion chambers thereof. Obviously such design objective, in turn, depends on many things including the avoidance of incomplete combustion or burning of the fuel actually introduced into the engine combustion chambers throughout the entire load and speed range of the engine.

Some form of metering device is usually employed for controlling the quantity or charge of fuel emitted from the fuel injector during the injection period or portion of the power cycle of each of the piston-cylinder assemblies associated with such fuel injector. It oftentimes happens that because of certain factors such as the direction of the fuel stream or spray with respect to the direction of the air flowing in the combustion chamber and the disposition of the fuel injector outlet orifice means the heterogeneous mixture formation present in certain areas of the combustion chamber is overly rich resulting in incomplete combustion of the fuel and, consequently, the formation of soot in the exhaust while in other areas of the combustion chamber an insufficient quantity of fuel is present in comparison with the quantity of air also present so that the desired fuel/air mixture for efficient combustion cannot be formed. In addition to the aforementioned factors influencing the utilization of air and fuel introduced into the engine combustion chamber and, hence, the efficiency of the combustion process taking place in the combustion chamber, the rate, as distinguished from quantity, of fuel entering the combustion chamber of the engine during each ignition period also has a decided effect on the overall efficiency of the combustion process. Heretofore, the rate at which the metered charge of fuel emerged from the fuel injector was quite uncontrolled. Consequently, by failing to control the rate at which fuel entered the combustion chamber in accordance with quantity of fuel actually needed to obtain maximum utilization of the fuel and air and to continually form the desired homogeneous fuel/air mixture throughout the injection period, undesirable high rates of pressure rise, knocking combustion noises, poor fuel economy and other related detrimental side effects occurred. It is, therefore, an important objective of the present invention to obviate the various shortcomings of prior fuel injection systems noted above by providing a fuel injection system wherein the rate at which liquid fuel is introduced into this cylinder is controlled so that all of the fuel entering the combustion chamber in the injection period is mixed with the air also introduced into the combustion chamber to form a desired homogeneous fuel/air mixture and at a formation rate consistent with good combustion control with the result that the efficiency of the engine combustion process is improved considerably.

A further object of the present invention is to control the rate at which liquid fuel is injected into an internal combustion chamber so as to prevent the formation of overly rich or extremely lean fuel/air mixtures and having a large quantity of combustible fuel/air available for burning in the combustion chamber at the start of ignition and to generally burn the fuel charge at a substantially uniform or even rate whereby an undesirable high rate of pressure rise, knocking, combustion noise and related detrimental side effects are substantially mitigated.

Another object is to establish small quantities of burnable mixtures in a successive order by introducing the liquid fuel charge into the combustion chamber by a multitude of small injections during the usual injection period and thereby avoiding a high rate of pressure rise in the combustion chamber since only small quantities of fuel are involved during each individual small injection.

Still another object is to provide a fuel injection nozzle for an internal combustion engine which will produce pulsating injections, each having a short duration during a single fuel injection period whereby the fuel charge is introduced into the combustion chamber in the form of a plurality of individual spurts, each spurt being of relatively small volume and of substantially the same volume as the other spurts.

Another object of this invention is to provide means for diverting during the injection cycle or period a portion of the pressurized fuel supplied by a fuel source to a region of low pressure to assist in producing pulsating injections of small amounts of fuel during the injection cycle.

Still another object is to provide means in a fuel injector device for controlling the opening and closing of the pressure responsive needle or discharge valve, said means including a fuel chamber in communication with a region of low pressure and adapted to be placed intermittently in communication with the source of pressurized fuel.

The above and other objects and advantages of the invention will be more readily apparent when read in conjunction with the accompanying drawings in which:

FIGURE 1 is a sectional view in elevation of a fuel injection nozzle embodying the present invention and showing a needle valve in a nozzle body in a closed position;

FIGURE 2 is a sectional view in elevation of the fuel injection nozzle as shown in FIGURE 1, but showing the valve in its open position;

FIGURE 3 is a needle valve lift diagram of a conventional fuel injection device, showing the needle valve in a lifted or open position during substantially the whole injection cycle; and FIGURE 4 is a needle valve lift diagram of a fuel injector device embodying the present invention showing the needle valve in sequentially opened and closed positions during the injection cycle.

Referring now to the drawings wherein like reference characters on the different views identify similar parts, the device shown in FIGURE 1 represents a fuel injection nozzle 10 which comprises a needle valve body 12 and a needle valve 14. FIGURE 1 shows the needle valve in its closed position and FIGURE 2 shows the needle valve in its open position. The valve body 12 has a longitudinally extending bore 16 formed in the central portion thereof in which the needle or discharge valve 14 is disposed for longitudinal reciprocation. A close sliding fit exists between the upper portion of the needle valve 14 and the bore 16. A second and smaller bore 18 is formed in the lower portion of the valve body 12 to accommodate the lower portion of the needle valve 14. A main fuel passage 20 adapted to be connected to a source of fuel under pressure, such as from a fuel injection pump, is also formed in the valve body 12. The fuel passage 20 connects to a main fuel chamber 22 surrounding the needle valve 14. A conical valve seat 24 is formed in the valve body 12 at the lower end of the bore 18. One or more nozzles or fuel injection orifices 26 are formed in the lower end of the valve body 12 and communicate with the lower end of bore 18. A secondary fuel passage or duct 28 is formed in the valve body 12 and is disposed so that it communicates with the bore 16.

An annular passage 30 is formed in the valve body 12 and connects the fuel passage 20 with the passage 28 so that fuel from the fuel supply source to which passage 20 is adapted to be connected will also flow to the passage 26.

A radially inwardly projecting shoulder 32 is disposed at the upper end of bore 16 and forms a stop to limit the upward travel of needle valve 14.

The needle or discharge valve 14 has a conical surface 34 formed on the lower end thereof to seat on the valve seat 24. The lower end of the needle valve 14 is formed with a reduced diameter portion 36, having a diameter slightly smaller than the bore 18, so that a circumferential fuel passage 38 is formed between the needle valve lower end and bore 18. This passage 38 establishes communication between the fuel passage 20, the fuel chamber 22 and the nozzle or injection orifice 26 when the needle valve 14 is unseated as shown in FIGURE 2.

The upper portion 40 of needle valve 14 makes a close sliding fit with the bore 16. This upper portion 40 has a wide circumferential groove 42 formed therein. This groove 42 with the adjacent part of the bore 16 defines a secondary fuel chamber 44 for receiving diverted fuel during operation of the fuel injection device 10, the opening of the needle valve 14 being effective to place the chamber 44 in communication with secondary duct 28. The groove 42 is defined in part by the side 46 which together with the outer periphery 48 of needle valve 14 defines a shoulder 49 terminating in a control edge 50. In the up and down movement of the needle valve 14, control edge 50 is effective to control the passage of fuel from duct 28 to chamber 44. The size and shape of groove 42 may be varied depending on design requirements. It will be observed from FIGURE 1 that with the needle valve 14 in a seated or closed position, the passage or duct 28 is blocked by control edge 50 on the needle valve so that fuel cannot enter the chamber 44 via the passage 28. On the other hand, when the needle valve is in the raised or open position as shown in FIGURE 2, passage 28 is not blocked and fuel can enter chamber 44.

While the chamber 44 is here shown as being defined by a groove formed in the needle valve, such a chamber might well be formed in the valve body or partially in the valve body and partially in the needle valve.

A compression spring 52 supported in the valve body by suitable means (not completely shown) is effective to hold the needle valve in a seated position on the valve seat 24. The spring 52 exerts its pressure on a suitable spring retainer 54 attached to a needle valve extension 56.

A leak-down channel 58 is formed in the upper portion of the needle valve 14 and provides continuous communication between the chamber 44 and an area 59 which is at substantially atmospheric pressure. This is one of the important features of this invention. As shown here, the channel 58 extends through the top of the needle valve 14. Fuel which passes from the chamber 44 through the channel 58 may be directed back to the fuel source, such as the fuel tank, through conduit 60. The leak-down channel 58 may vary in size from a few thousandths of an inch to a size considerably larger. The size of this channel 58 will be one of the factors which will determine the number of fuel injections during a single injection cycle as well as the amount injected with each injection. The channel 58 will have to be large enough to permit a sufficient amount of fuel to be siphoned off to reduce the fuel pressure in the main fuel chamber to a low enough point so that the pressure of spring 52 will reseat the needle valve on the valve seat 24.

FIGURE 3 is a diagram illustrating generally the position of a fuel injection needle valve in a conventional fuel injection device which does not embody the invention disclosed herein. The curve 62 shows that once the needle valve is lifted to its maximum point, i.e., providing maximum opening of the valve, it remains open for the duration of the injection cycle. Thus, it will be apparent that in such a conventional arrangement a steady stream of fuel is injected.

The injection cycle I refer to herein is that period of time during which fuel would normally be injected into an engine cylinder for a certain number of degrees of crankshaft rotation. This cycle usually commences a number of degrees before a piston reaches a top dead center position and may continue for a few degrees after that position is reached.

FIGURE 4 is a diagram illustrating generally the positions a fuel injection needle valve occupies in a fuel injection device embodying the invention disclosed herein during the fuel injection period. The curve 64 shows that the needle valve opens and closes several times during the injection cycle. It will be apparent that the pulsating motion of the needle valve allows fuel to be injected several times, but only for short intervals, during the injection cycle.

In operation of this improved fuel injector device, fuel is pumped from a fuel injection pump (not shown) under pressure into the main fuel passage 20, the main fuel chamber 22 and the secondary passage 28 through the annular passage 30. The fuel pressure acts on underside 41 of the needle valve 14 lifting it from its seat 24 against the pressure of spring 52. At this point injection begins. During the continued upward movement of the needle valve 14, the secondary passage 28 is unblocked as the control edge 50 moves across the outlet from passage 28. This opens secondary fuel chamber 44 to the pressurized fuel. While fuel flows into chamber 44, fuel also escapes from the chamber through leak-down channel 58, and eventually to the fuel tank through conduit 60. In addition, fuel is injected into combustion chamber (not shown) through orifice 26. Thus the pressure in the system is relieved and permits the force of spring 52 to momentarily reseat the needle valve on its seat 24 interrupting the injection. While the needle valve is reseated, the secondary passage 28 is again blocked by the shoulder 49 and control edge 50. Pumping continues, allowing the fuel pressure to build up again and act on the underside 41 of the needle valve to lift it against the force of spring 52. The needle valve is again opened as illustrated in the diagram of FIGURE 4, and the injection sequence is repeated.

It will be appreciated that there are several variables involved which must be considered in arriving at the desired amount of fuel to be injected and the number of injections to take place during a single injection cycle. This requires proper correlation of such factors, for example, as the fuel pressure, the leak-down channel size, the secondary fuel chamber size, the distance between the control edge on the needle valve and the secondary duct exposure, the needle mass, the spring force, the orifice opening size, and the combustion process being employed in the engine.

In the conventional type of injection as shown in FIGURE 3, injection takes place during substantially the full injection cycle. According to the present invention, the same amount of fuel may be injected during the injection cycle but provision is made for a successive introduction of fuel into the combustion chamber. The pulsating injection allows only small and substantially uniform quantities of fuel to be intermittently injected into the combustion chamber. Bleeding off a portion of the fuel eliminates the high pressure rise at the beginning of the injection cycle. The more uniform introduction of fuel throughout the injection cycle permits better combustion and improves the air/fuel mixture in the associated combustion chamber. The injection cycle can be designed so that small quantities of fuel can be injected ahead of conventional timing thus allowing thorough mixing to take place for initial ignition. Because of the small quantities of fuel involved, the subsequent effect of knock and the high rate of pressure rise would be diminished. With appropriate air movement in the combustion chamber the burning zones are given time to be carried away and fresh air is introduced into the area where the fuel spray is directed. Thus combustion can be effectively controlled with a resulting diminishing of combustion losses.

While a specific embodiment of the invention has been illustrated and described, it is to be understood that the invention is not limited thereto as other variations will be apparent to those skilled in the art.

What is claimed is:

1. A fuel injector device for an internal combustion engine comprising, a nozzle body; a full-receiving chamber formed in said nozzle body in fluid communication with a source of fuel under pressure of a predetermined magnitude for a predetermined interval of time; orifice means in said nozzle body for ejecting pressurized fuel from said chamber; valve means for controlling the flow of fuel from said chamber through said orifice means including an elongated needle valve element disposed within said nozzle body, said needle valve element being movable longitudinally with respect to said nozzle body between two positions corresponding to the open and closed conditions, respectively, of said valve means; biasing means yieldably urging said valve means closed, said valve means being responsive to the attainment of fuel pressure of said predetermined magnitude in said chamber to open; and means for intermittently reducing the pressure of the fuel in said chamber below said predetermined magnitude during said predetermined interval of time to allow rapid and periodic closing of said valve means by said biasing means including a second fuel receiving chamber and leak-down channel means providing fluid communication between said second chamber and a point in the fuel supply system wherein the magnitude of fuel pressure is less than said predetermined magnitude, said means for intermittently reducing the pressure of the fuel in said first-mentioned chamber below said predetermined magnitude during said predetermined interval of time further including means responsive to movement of said needle valve element toward its open position to divert fuel from said first-mentioned chamber to thereby reduce the pressure of fuel in said chamber below said predetermined magnitude, said last-mentioned means also being effective to direct the fuel diverted from said first-mentioned chamber to said second chamber.

2. A fuel injector device as set forth in claim 1, wherein said nozzle body is provided with a longitudinally extending bore means therein, and said needle valve element has an enlarged end section slidingly engaging a wall surface portion of said bore means so as to be supported thereby for relative longitudinal sliding movement; and said enlarged end section of said needle valve element being provided with an annular groove, the surfaces defining said groove and said wall surface portion of said bore means defining said second chamber means.

3. A fuel injector device as set forth in claim 2, including recess means formed in said wall surface portion of said bore means partially defining said second chamber means; first fuel passageway means extending between and providing fluid communication between said source of fuel under pressure and said first-mentioned chamber means; a second fuel passageway means having one end opening into said first fuel passageway means intermediate said source of fuel under pressure and said first-mentioned chamber means and its opposite end in fluid communication with said recess means; and said means responsive to movement of said needle valve element toward its open position to direct fuel from said first-mentioned chamber and also to direct fuel diverted from said first-mentioned chamber to said second chamber includes a cylindrical portion of said needle valve element enlarged end section extending longitudinally from one end of said enlarged end section to said groove, said cylindrical portion covering said recess means when said needle valve element is in its closed position, said recess means commencing to be uncovered by said cylindrical portion during movement of said needle valve element from its closed position toward its opened position and being completely uncovered when said needle valve element is in its fully opened position.

4. A fuel injector device as set forth in claim 3, wherein said leak-down channel means is in the form of a fuel duct extending longitudinally through said cylindrical portion, said fuel duct having one end opening into said second chamber and a point in the fuel supply system at substantially atmospheric pressure.

References Cited

UNITED STATES PATENTS

| 2,647,015 | 7/1953 | Berlyn | 239—99 |
| 2,647,016 | 7/1953 | Berlyn | 239—99 |

EVERETT W. KIRBY, Primary Examiner

U.S. Cl. X.R.

239—90, 95, 99, 453